United States Patent Office 3,271,764
Patented Sept. 6, 1966

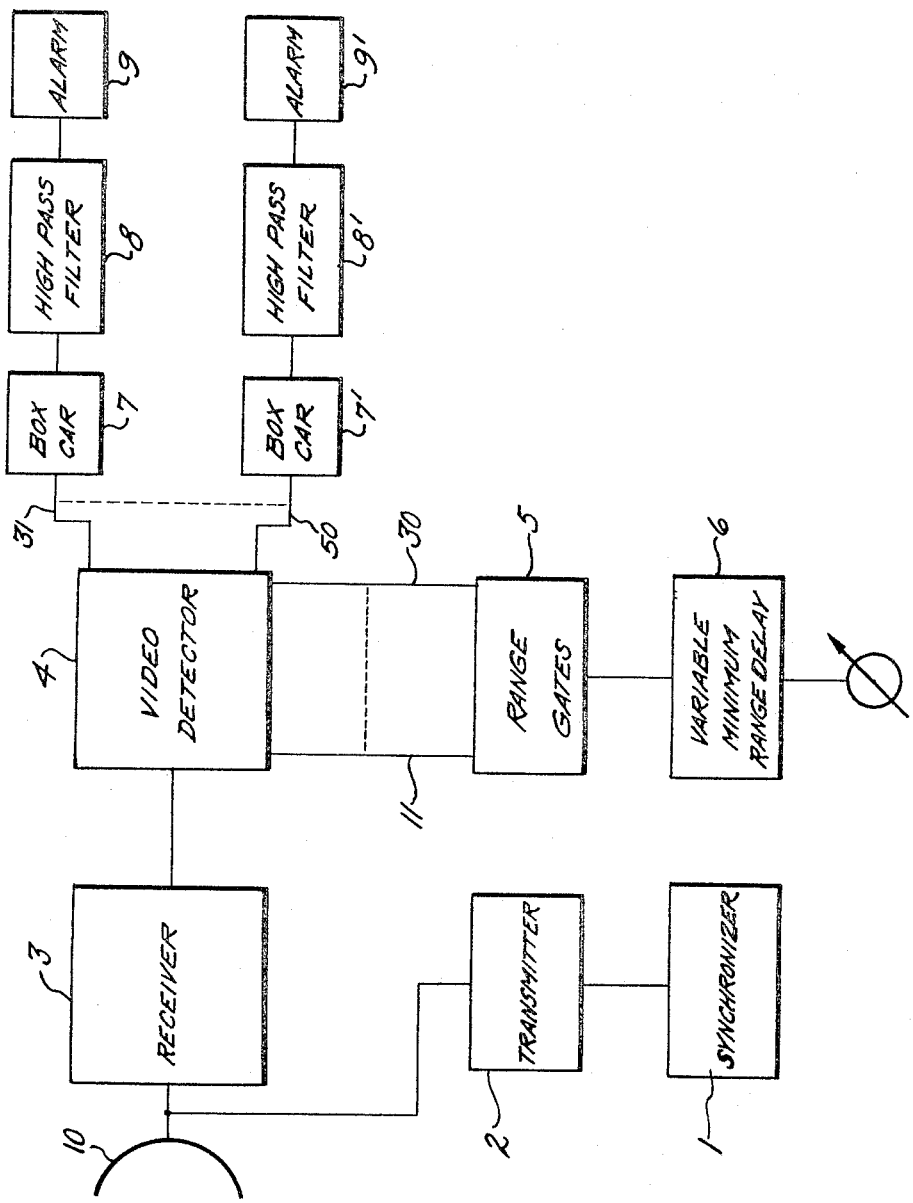

3,271,764
RADAR TORNADO ALARM
David Atlas, Newton, and Roger M. Lhermitte, Sudbury, Mass.; said Atlas assignor to the United States of America as represented by the Secretary of the Air Force
Filed Apr. 24, 1964, Ser. No. 362,533
7 Claims. (Cl. 343—11)

The invention described herein may be manufactured and used by or for the United States Government for governmental purposes without payment to us of any royalty thereon.

The present invention relates to a radar system for detecting tornadoes, and more particularly to a radar system wherein a tornado is detected and an alarm is sounded upon such detection.

The high circulatory velocities associated with tornadoes may be detected in the Doppler shifted radar echoes from the precipitation particles and debris rotating within the funnel. However, conventional pulse radars have no means of measuring the Doppler velocities. This invention provides a system by which such a conventional pulse radar may be used to provide a unique tornado alarm. The system is of particular importance since Doppler radar methods are expensive and their use in storm detection seems a long way off. However, conventional radars are in widespread use throughout the world. The present invention is particularly useful in view of the great annual loss of life associated with tornadoes.

The circulatory velocities within a tornado vortex are likely to be 200 knots ($\approx$100 m./sec.) or greater and it may be expected that detectable precipitation particles and debris will move with equal velocities, or perhaps somewhat less. Since the diameter of a tornado vortex is typically a few hundred feet, it will generally fall entirely within the radar beamwidth. Thus, radial motions of the particles with respect to the radar are bound to exceed $\pm 50$ meters/sec. That is, within the radar pulse volume, particles will be moving both toward and away from the radar with speeds of 50 meters/sec. or more. There is no other meteorlogical phenomenon which will produce such a condition.

When particles (within the pulse volume) more relative to each other with velocity $v$ (radially from the radar) the resulting echo amplitude fluctuates with a frequency $f=2v/\lambda$ where $\lambda$ is the radar wavelength. In a tornado with radial velocities of $\pm 50$ m./sec. or more, $v$ will exceed 100 m./sec., and the echoes will fluctuate with a frequency $f=2000$ c.p.s. or greater at a wavelength of 10 cm. In order to measure this frequency, the radar pulse repetition frequency must be equal to or greater than 4000 p.p.s. This corresponds to a maximum unambiguous range of only 23.3 miles. While echoes will be received from ranges beyond 23 miles, they will appear falsely at ranges less than this, and may be mixed with echoes from nearby targets. However, this is of no consequence in the present system except in the rare case of two tornadoes in the same direction. The present invention provides a system to detect fluctuation frequencies of the order of 2000 c.p.s. or higher and utilizes the detected signal to actuate an alarm indicative of a tornado.

In elaboration of the theory of the present invention, consider a tornado circulation carrying detectable precipitation particles and/or debris around in a circular fashion, with circulation around a vertical axis. Tornadoes are generally limited to a few hundred yards in diameter and so are usually encompassed entirely within a beam width of a typical radar. For the purpose of further discussion we may consider only those particles which have instantaneous velocities radially outward from and radially inward toward the radar. On one side of the tornado, the particles will move toward the radar with radial velocity $v$; if the tornado itself is not translating horizontally, or is moving only slowly, then the particles on the opposite side of the tornado are moving *away* from the radar with approximately the same velocity. Now, it is well known that a target moving at velocity $v$ will produce a Doppler *frequency* shift $f=2v/\lambda$ where $\lambda$ is the radar wavelength. This formula is described in Terman's Radio & Electronic Engineering, page 1032, published in 1955 by McGraw-Hill. Thus the radially moving particles on either side of the tornado center will produce Doppler shifts $f=2v/\lambda$ and $f=2v/\lambda$. With a conventional radar these Doppler shifts cannot be detected. However, since the echoes from both sides of the tornado arrive at the radar receiver simultaneously, they beat with one another to produce a composite echo which fluctuates with the difference frequency or $$f=\frac{2v}{\lambda}-\left(-\frac{2v}{\lambda}\right)=\frac{2}{\lambda}(\mu)$$

where $\mu=2v$ is the relative velocity between the targets on either side of the tornado.

Mathematically, the signal corresponding to targets moving with velocity $v$ can be requested by signal $ae^{-iwt}$ where $w=2\pi f$ and $f$ is the Doppler shift, and we have simply omitted the term corresponding to the carrier frequency. The target on the other side of the tornado move with velocity $-v$, and if their signal intensity is the same, the corresponding signals may be represented by $ae^{+iwt}$. These signals are summed in the receiver and squared to provide the signal intensity or power $$I=[ae^{-iwt}+ae^{+iwt}$$
$$=2a^2+2a^2e^{-i(2wt)}$$

In other words, the average intensity is $2a^2$ and there is a fluctuating component of the intensity having radian frequency $2\omega=2\pi(2f)$. Note that $f=2v/\lambda$ is the Doppler shift and the frequency of echo intensity fluctuation is $$f=2f=\frac{2}{\lambda}(2v)=\frac{2}{\lambda}\mu$$

where $\mu=2v$ is the relative velocity between the velocities on either side of the tornado.

Clearly, if the echo intensity fluctuates with a frequency F, the radar must sample this frequency at a rate of 2F in order to sample both the maximum and minimum of the fluctuation. Thus, if the tornado circulatory velocity is 50 m./sec. (ie.. 100 knots) then at 10 cm. wavelength $f=2(10^4 \text{ cm./sec.})/10 \text{ cm.}=2000$ c.p.s. Therefore, at 10 cm. wavelength, the minimum PRF would have to be 4000 p.p.s.

An object of the present invention is to provide a radar system to detect a tornado.

Another object of the present invention is to provide a radar system to detect a tornado and to sound an alarm upon such detection.

The various features of novelty which characterize this invention are pointed out with particularity in the claims annexed to and forming a part of this explanation. For a better understanding of the invention, however, its advantages and specific objects obtained with its use, reference should be had to the accompanying drawing and descriptive matter in which is illustrated and described a preferred embodiment of the invention.

Referring now to the drawing of the system of the present invention, synchronizer 1 triggers the transmitter 2, causing it to transmit pulses via antenna 10 at a PRF 4000 p.p.s. or higher. Echo pulses will be returned to receiver 3 by way of antenna 10. The output of receiver 3 is detected by video detector 4. A bank of 20 range gates 5, each covering a range interval of ½ mile (as arbitrary value) and contiguous to one another to cover a range interval of ten miles (also arbitrary) is centered over the range of the storm by the manual control on the minimum range delay 6. The 20 range gates are connected to video detector 4 by lines 11–30. Thus, the video in each range element is passed to a corresponding boxcar circuit 7. There are 20 output channels from video detector 4 by way of lines 31–50 and a description for one will suffice for all. Each output channel is representative of a preselected range and is comprised of a boxcar circuit 7, highpass filter 8 and an alarm 9. Boxcar circuit 7 holds the peak level of the video for a duration equal to the pulse repetition period and then takes on the new level of the echo amplitude at the same range in the next pulse. The output of each boxcar circuit is then passed to a high pass filter 8 which passes frequencies only exceeding 2000 c.p.s., or the threshold frequency found to be characteristic of tornadoes in practice. Any output from the set of high pass filters triggers one of a set of alarms such as 9, indicating the presence of a tornado at the corresponding range. Alarm 9 may be a conventional indicator such as a light or bell actuated by a signal from filter 8 and may be such as shown and described in U.S. Patent No. 2,521,016.

In a wave detailed description of the system shown in the drawing of the present invention to relate the operation thereof to the basic theory. Consider one of the 20 range gates 5. The gate corresponding to line 11 allows video detector 4 to pass video detected signal to boxcar 7 through line 31. For each pulse transmitted by transmitter 2, there will be a video echo in this range interval passed to boxcar 7 along line 31. The voltage level of the successive series of echo pulses in this range gate interval will fluctuate, and it is the purpose of the boxcar 7 high pass filter 8 combination to detect flunctuation frequencies corresponding to those above a threshold frequency representative of a tornado. Boxcar 7 holds the peak level of the video echo voltage for a duration equal to the pulse repetition period, and then takes on the new level of the echo amplitude at the same range corresponding to the next transmitted pulse. In this way, the output of boxcar 7 is seen to be a fluctuating voltage which is representative of the fluctuating echo amplitude in the corresponding range gate. The fluctuating voltage output of boxcar 7 is then passed through its associated high pass filter 8. High pass filter 8 is set to pass only frequencies above say 2000 c.p.s., or other threshold frequency found to be characteristic of tornado echoes. If there is such a high frequency component in the fluctuations, then there will be signal on the output of filter 8 which will trigger the corresponding alarm 9.

The multiplicity of range gates and associated boxcar, filter, and alarm circuits is required to detect a tornado quickly and with confidence without requiring excessive searching in range by the operator as would be required if only a single gate were used. Since a storm region may provide echoes extending simultaneously over a considerable range, say 10 miles, but the tornado may occur in a range interval of ½ mile or less, the equipment must search for high echo fluctuating frequencies simultaneously in all 20 range gates. Moreover, by using a multiplicity of range gated circuits, the equipment can be used while the antenna is scanning in azimuth, thus permitting an entire storm region to be examined for tornado velocities or super-threshold fluctuates frequencies. Of course, a single range gate may also be used, but the operator would then be required to scan its position in range. Combined with the required azimuth scan, the procedure would be slow and may not provide sufficiently early warning of tornado fluctuating frequencies.

Since the tornado may be at a range greater than the maximum unambiguous range corresponding to the high (4000 p.p.s.) PRF, the operator then switches the synchronizer to a low PRF, say 500 p.p.s., permitting the true range of the storm to be displayed on a PPI scope.

Because we are concerned only with extremely high fluctuation frequencies, the device may be used while the radar beam is scanning, provided the scan rate is not excessive. It is to be noted that where the antenna is scanning, the azimuth of the detected tornado may be obtained in the conventional manner.

The number of range gates, boxcars, and high pass filters required depends upon the degree of sophistication desired and the cost that can be tolerated. However, a minimum of 20 gates covering a range of ten miles is desirable so that the operator can center the alarm system over any suspicious storm echoes. Because of range ambiguities, the ten mile range coverage will simultaneously cover a number of such intervals out to the radar horizon.

In lieu of the high pass filter and alarm combination in one of aforesaid channels there may be substituted other means and methods such as a simple frequency meter which may be read or in itself associated with an alarm.

What we claim is:

1. A radar tornado detection and alarm system wherein radar pulse returns from said tornado fluctuate in frequency determined by the velocity characteristics of the tornado comprising means for directing radiant energy in the form of pulses toward the region of said tornado, said directed pulses having a repetition frequency larger in magnitude than said fluctuating frequency, means to receive return pulses from said tornado and said region, means to detect said return pulses at preselected range intervals, means to select from said detected pulses only signals exclusively representative of said tornado at the corresponding range interval thereof, said selecting means including a series combination of a boxcar circuit and a high pass filter with said filter passing signals having frequencies exceeding two thousand cycles per second.

2. A radar tornado detection and alarm system as described in claim 1 further including an alarm for each of said corresponding range intervals wherein said alarm is actuated by said signals exclusively representative of said tornado.

3. A radar tornado detection and alarm system wherein radar pulse returns from said tornado fluctuate in frequency as determined by the velocity characteristics of the tornado comprising means for directing radiant energy in the form of pulses toward the region of said tornado, said directed pulses having a pulse repetition frequency larger in magnitude than said fluctuating frequency, means to receive return pulses resulting from said directed pulses, means to detect said return pulses at preselected range intervals for a preselected range, said preselected range being adjustable to center at said tornado, means to select from said detected pulses signals exclusively representative of said tornado at a preselected range, said selecting means including a series combination of a boxcar circuit and a high pass filter with said filter passing signals having frequencies in excess of 2000 cycles per second, and an alarm for each of said preselected range intervals, said alarm being actuated by signals exclusively representative of said tornado at said preselected range interval.

4. A radar tornado detection system comprising means for directing radiant energy in the form of pulses toward the region of said tornado, said directed pulses having a pulse repetition frequency in the region of 4000 cycles per second, means to receive return echoes from said tornado, a video detector connected to said receiving means, a filter passing signal with frequencies in the region of 2000 cycles per second, a boxcar circuit interconnecting said filter and said video detector, and an alarm connected to the output of said filter, said alarm being activated upon the passage of a signal through said filter.

5. A radar tornado detection system comprising means for directing radiant energy in the form of pulses toward the region of said tornado, said directed pulses having a repetition frequency of 4000 cycles per second, means to receive return echoes from said tornado, a video detector connected to said receiving means, a filter passing signals with a frequency of 2000 cycles per second, a boxcar circuit interconnecting said filter and said video detector, and alarm means connected to the output of said filter, said alarm means being activated upon the passage of signals through said filter.

6. A radar tornado detection system comprising a transmitter generating radiant energy pulses, a synchronizer connected to said transmitter, said synchronizer operating to control the pulse repetition frequency of said transmitter to provide a pulse repetition frequency of 4000 c.p.s. for tornado detection purposes and a 500 cycles per second for range detection purposes, antenna means receiving said radiant energy and operating to direct said pulses toward said tornado, means to receive return echoes from said tornado, means to video detect said received return echoes, a filter passing signals having frequencies in excess of 2000 cycles per second, a boxcar circuit interconnecting said filter and said video detector means, and an alarm connected to the output of said filter, said alarm being activated by the passage of signals through said filter.

7. A radar tornado detection system comprising transmitter means generating radiant energy, means to control the pulse repetition frequency of said transmitter in the region of 4000 cycles per second for tornado detection purposes and in the region of 500 cycles per second for range detection purposes, antenna means receiving pulses for tornado detection purposes and directing said pulses toward said tornado, antenna means to receive return echoes from said tornado, means to detect said return pulses at preselected range intervals for a preselected range, said preselected range being adjustable to center at said tornado, a series combination of a boxcar circuit and a high pass filter for each of said preselected range intervals to receive said detected return signals, said filter passing signals having frequencies in the region of 2000 cycles per second, and separate alarm means for each of said series combination, said separate alarm means being activating upon the passage of a signal through its associated series combination.

References Cited by the Examiner

UNITED STATES PATENTS 2,535,274 12/1950 Dicke _____ 343—7.7
2,659,078 11/1953 Sherr _____ 343—7.7

CHESTER L. JUSTUS, *Primary Examiner.*

P. M. HINDERSTEIN, *Assistant Examiner.*